United States Patent Office 3,305,600
Patented Feb. 21, 1967

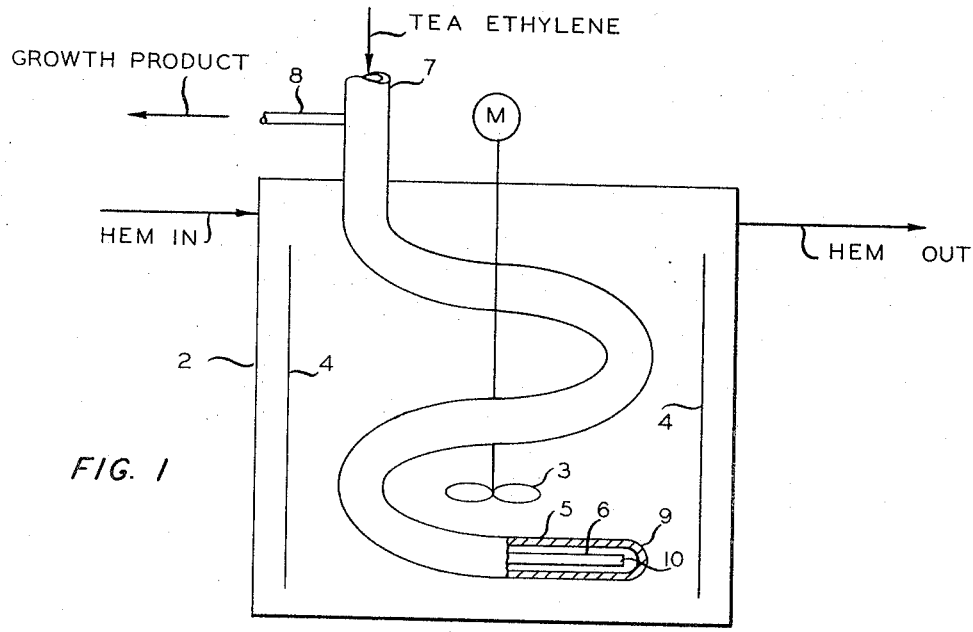
FIG. 1
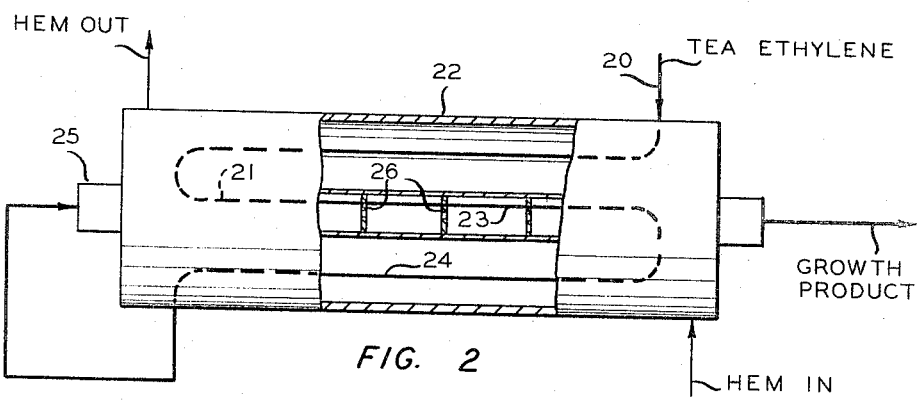
FIG. 2
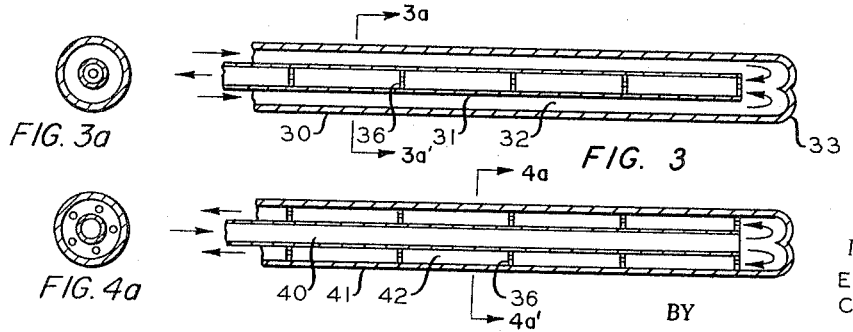
FIG. 3
FIG. 3a
FIG. 4
FIG. 4a
INVENTORS
E. E. HOPPER
C. A. WENTZ, JR
BY
ATTORNEYS

3,305,600
CHEMICAL REACTIONS IN COMPOSITED TUBULAR REACTION ZONE AND APPARATUS THEREFOR
Edward E. Hopper and Charles Alvin Wentz, Jr., Bartlesville, Okla., assignors to Phillips Petroleum Company, a corporation of Delaware
Filed June 20, 1963, Ser. No. 289,312
8 Claims. (Cl. 260—683.15)

This invention relates to the accomplishment of a chemical reaction involving heat exchange in a composited tubular reaction zone. It also relates to the effecting of such a reaction in a composited tubular reactor apparatus.

In one of its aspects, the invention relates to a chemical reaction involving heat exchange between reactants in at least one stage of an operation with a mass resulting from such stage and with a further heat-exchange medium, as later described. In another of its aspects, the invention relates to the removal of heat of reaction in the growth of an aluminum trialkyl to a long-chain aluminum alkyl in the production of, preferably, 1-olefins, by passing the reactants through a growth tube or tubular reaction zone in which the growth reaction is substantially effected, and then passing the reacted mass, with expansion to a lower pressure, through an expansion tube or zone disposed within said tubular reaction zone. In a further aspect of the invention, the composited tubular reaction and expansion zones are disposed in a cooling zone containing a coolant which, to a substantial extent, encompasses said zones. In another aspect of the invention, the heat of reaction of, say, a growth of an aluminum trialkyl is removed into the expanding hot reacted mass by passing said mass through a series of expansion stages or zones disposed within a zone also containing at least an appreciable portion of the zone in which the reactants are reacting with liberation of heat as where the tubular reactor is contained over an appreciable length thereof within a series of expansion sections or zones or the series of expansion zones is contained within a surrounding reaction zone. In a further aspect of the invention, it relates to apparatus for conducting a chemical reaction, said apparatus comprising, in combination, in one form thereof, a tubular or elongated reaction conduit which can be coiled or otherwise shaped opening at the end thereof into another conduit which concentrically surrounds said reaction conduit, thus providing means whereby to permit heat exchange between the reacting mass and a mass which has been reacted and has been or is being expanded through the latter conduit. In a still further aspect of the invention, the reaction conduit can advantageously surround the expansion or cooling conduit. In a further aspect still, the invention relates to an apparatus in which at least a portion of an elongated reaction conduit is encompassed within an expansion conduit, the end of said reaction conduit being connected with an end of said expansion conduit, said expansion conduit containing said reaction conduit also containing a plurality of transversely disposed or otherwise retained expansion means to provide for a succession of pressure expansions of reactive mass passing therethrough. In a still further aspect of the invention, it relates to an apparatus wherein at least two adjacent conduits, as described, are disposed within means containing the heat exchange medium which, in a preferred form, can surround or encompass at least a portion of the reaction conduit and/or at least a portion of the expansion conduit.

The production of linear 1-olefins by way of a growth reaction involving, say, triethyl aluminum and ethylene, can be conveniently considered in three stages:

(1) Growth of triethyl aluminum by reaction with ethylene to yield long-chain aluminum alkyls. This stage involves a building-up or growth of the hydrocarbon chains at, say, a temperature in the range 90–250° C. and an ethylene pressure greater than about 70 atmospheres and up to about 200 atmospheres or perhaps somewhat higher. The three valences of aluminum in the reaction here discussed are carbon-aluminum bonds. Thus, the alkene, such as ethylene, is grown or reacted onto low molecular weight aluminum trialkyls, such as aluminum triethyl, to yield an aluminum trialkyl in which the alkyl radicals have a substantially increased number of carbon atoms. Thus, when ethylene is reacted with or onto aluminum triethyl, a mixture of aluminum trialkyls can be obtained wherein the alkyls contain even numbers of 4–16 and more carbon atoms. The heat of reaction in this stage is substantial;

(2) The displacement of the chains or olefins from the aluminum trialkyl with a low molecular weight alkene, say, ethylene, to give long-chain olefins and regenerated aluminum trialkyl which can be a thermal or colloidal nickel catalyzed cleavage of the alkyl aluminum bond to yield the free olefin and dialkyl aluminum hydride which later then reacts with the displacing olefin or alkene to regenerate the trialkyl aluminum; and (3) The separation of the long-chain olefins from the regenerated aluminum trialkyl.

In the growth reaction, some displacement reaction tends to occur producing higher free 1-olefins along with the aluminum alkyls. If the concentration of these higher free 1-olefins becomes appreciable during the growth reaction, they will react with the aluminum alkyls in a reaction, termed "regrowth," which produces beta-branched aluminum alkyls which are very unstable at growth reaction temperatures and which are readily displaced by ethylene or other 1-olefins to give branched-vinyl olefins. It has been found that a 10° C. rise in temperature more than doubles the rate of growth and side reactions, markedly increasing the undesired branched-vinyl content of the reaction product.

It has now been found that both the displacement and regrowth side reactions can be suppressed materially by carrying out the growth reaction in a tubular reaction zone in which the growth reaction temperature is controlled to an optimum, by heat exchange of the growth reaction mass as it is forming, with the expanding, and, therefore, cooling, reaction mass in which a desired growth has been accomplished, by surrounding the reaction zone by, or placing it within, a similar tubular expansion zone, in which there can be, and in one embodiment is, provided a series of expansion zones or chambers.

The present invention, then, in one of its aspects, is concerned with a method and a means or apparatus which are applicable with nicety to the foregoing, as well as to other reactions in the chemical arts, in which heat exchange is advantageous and its accomplishment is desired to be effected with simplicity and/or refinements as appears from this disclosure to control the temperature to a desired optimum.

It is an object of this invention to provide a method for the accomplishment of a chemical reaction involving heat exchange. It is another object of this invention to provide for a reactor apparatus for the accomplishment of chemical reaction involving heat exchange. It is a further object of this invention to provide an apparatus for conducting a chemical reaction involving heat exchange and temperature control in which a reacting mass yielding heat of reaction can be cooled by later expansion of said reacting mass. A further object of this invention is to provide a reactor in which a reacting mass can be initially heated and finally cooled by a heat exchange medium at a given temperature. Another object of the invention is to provide a reactor in which a mass desired to be reacted can be initially heated by a heat exchange medium, then, during its heat output, cooled by expansion of the ultimately reacted mass, and wherein, if desired, the reacted mass, after its heat output, can be cooled by said heat exchange medium before said mass is expanded. It is a further object of this invention to provide an improved method for the production of aluminum alkyls by the so-called "growth" reaction. It is a further object of this invention to provide apparatus wherein there can be produced advantageously the "growth" of aluminum alkyls by reaction with olefins and wherein there can be produced longer-chain 1-olefins from the "growth" product. It is a further object of the invention to provide a readily controlled method and apparatus for the production of long-chain 1-olefins. It is a still further object of the invention to provide method and means for effecting heat interchange between a reacting mass yielding exothermic heat of reaction and the finally reacted, expanded mass. It is a still further object of the invention to provide such a method and means as here stated in which the cooling effect of an expanded reaction mass can be utilized while still utilizing a further coolant.

Other aspects, objects and the several advantages of this invention are apparent from the study of this disclosure, the drawing and the appended claims.

According to the present invention, there is provided a method of conducting a chemical reaction in at least two stages, an exothermic reaction stage and a heat absorption stage, which comprises passing a reactant mass into and through an elongated reaction zone while exothermic heat of reaction is being liberated therein, causing an expansion and cooling of said mass to occur at about the end of said reaction zone, and then passing the expanded mass, while heat of reaction is being absorbed, through an elongated zone concentrically-disposed with respect to said reaction zone. In one modification, the concentrically-disposed zones are encompassed within a heat-exchange medium or coolant-containing zone. In one form of the method of the invention, the expanding or expanded mass is passed into countercurrent flow heat exchange through a tubular or elongated expansion or cooling zone disposed axially within the tubular or elongated reaction zone, the latter being disposed, if desired, within a zone containing a coolant, thus, in effect, cooling the reaction zone from both boundaries of an annulus or annular-like configuration or arrangement, the reaction zone being the intermediate of the three zones here noted. In another form of the method of the invention, the reaction zone can be substantially-axially disposed for, at least, a substantial length thereof within an elongated expansion zone, the reaction zone encompassed within the elongated expansion zone being arranged in a preferred embodiment axially within the elongated expansion zone. In the last-described form of the method of the invention, a portion of the reaction zone and/or the expansion zone, can be encompassed within a heat-exchange medium-containing zone. Thus, it is possible to cause the initially reacting reactants to pass through a portion of the reaction zone which is disposed within the heat-exchange medium-containing zone wherein the reaction mass can actually receive heat, then, when the reaction mass is giving off exothermic heat in excess of that desired to reach the desired reaction temperature, it can be traversing the expansion zone wherein the temperature of the reaction mass is controlled to a desired level by the expansion of the already-reacted reaction mass passing through said expansion zone. The expansion zone or zones of the invention can have one or more points at which expansion or drop in pressure occurs. In this manner, an average ΔT between the reacting mass and the expanding reacted mass can be maintained as nearly as desired. Further, in that modification in which the reacting mass is sufficiently reacted that vigorous cooling thereof is no longer desired, then just prior to its expansion in the expansion zone, it can be made to traverse a portion of the reaction zone located within said coolant or heat-exchange medium-containing zone, since cooling at this stage, or some heating, depending upon conditions, may be advisable prior to expanding the then completely-reacted mass.

Still according to the invention, there is provided an apparatus comprising, in combination, concentric tubular reaction and cooling means, substantially axially disposed together, the downstream end of the inner tubular means being open, the end of the concentrically surrounding tubular means which is at the end of inner tubular means being closed, thus forming a continuous conduit extending from the inlet of the inner conduit to the outlet of the outer conduit, in a preferred form of the invention, said tubular conduits being disposed within a means adapted to contain a heat exchange medium. Still according to the present invention, there is provided an apparatus comprising in combination, a reaction passageway and a reacted reactants passageway, at least a portion of said passageways being disposed together so that the one thereof is contiguous to the other, said passageways being connected to form a continuous passageway, said reacted reactants passageway, or at least a portion thereof, containing means to permit a pressure reduction of reacted reactants passing through said last-mentioned passageway. Still further according to the present invention, there is provided an apparatus comprising a vessel adapted to contain a heat-exchange medium or bath, a reaction tube or passageway disposed within said bath, an expansion tube or passageway also located in said heat exchange medium, said reaction tube at one of its ends being connected to said expansion tube, forming a continuous passageway therewith, one of said tubes encompassing the other of said tubes over a substantial length thereof within said heat exchange medium.

Further still according to the present invention, a strong unitary combination of elements for providing the desired heat exchange between the reacting reactants and the expanding reacted mass is provided comprising, in combination, an inner tube and an outer tube which can be concentric therewith, the inner tube being supported within the outer tube by support members positioned upon the inner tube and extending therefrom to and made integral with the interior surface of the outer tube, said elements constituting means for providing a pressure drop for material flowing within the annulus formed between said tubes. In one embodiment, the elements are constituted by sectional or whole flange elements and especially when a whole flange element is employed, such an element will have therein at least one orifice. It will be obvious to one skilled in the art in possession of this disclosure having studied the same, that within the inner tube, there can be provided elements or flanges to provide pressure drop, if desired, within the inner tube. Such construction is readily accomplished. One skilled in the art employing various welding techniques can composite the pipes and elements or flanges. Briefly, the annular flanges can be mounted upon the inner pipe, the inner pipe positioned within the outer pipe and the flanges peripherally spot-welded to the outer pipe, a similar technique can be used to position the elements within the inner pipe. In positioning the elements into either the inner pipe or the annulus, use can be made of the orifices, where provided, or of the fact that the elements are less than whole flanges to support the elements while these are being welded or otherwise made integral with respect to pipes. The elements, sectional flanges, or orifice flanges, additionally will permit thin-walled pipes to be employed and to cause desired turbulence within the pipes, thus yielding improved heat transfer. The positioning of the apertures within the elements or flanges or in successive elements or flanges will be such as to create a desired path of flow for optimum heat transfer.

Referring now to the drawings, FIGURE 1 is an elevational cross-section of a reactor apparatus according to the invention in which the passageways are concentrically disposed throughout their respective lengths, are formed into a coil, the coil being mounted within a cooling vessel. FIGURE 2 is a diagrammatic section taken through a plane passing through the longitudinal axis of the apparatus showing a portion of the reaction tube encompassed within an expansion tube having a plurality of expansion orifices. In FIGURE 3, there is shown a longitudinal cross-sectional view along a plane passing through the axis of concentrically-arranged tubes, the inner of which is provided with plates having orifices therein for purposes of permitting expansion and agitation of the contents of the tube. FIGURE 3a shows a cross-sectional view of the apparatus of FIGURE 3 taken along section 3a–3a'. In FIGURE 4 there is shown concentrically-arranged tubes in which the orifices are in the annular portion of the apparatus. FIGURE 4a is a cross-sectional view of the apparatus of FIGURE 4 taken along section 4a–4a'.

Referring now to FIGURE 1, there is disposed in cooling medium containing vessel 2 equipped with stirrer 3 and baffles 4, a coil tubular passageway 5 having substantially concentrically-arranged therein a smaller diameter passageway 6. Passageway 5 is closed at its lower end and passageway 6 is open at its lower end so that flow entering 5 at 7 will emerge from 6 at 8. As shown, triethyl aluminum and ethylene are introduced at a pressure in the range 1500 to 3000 pounds per square inch and at a temperature in the range 225–350° F. into pipe 5 at 7. The temperature of the reacting mass is maintained by the operation of stirrer 3 which circulates cooling medium around pipe 5 in a downwardly direction and upwardly through the annulus or space between the walls of vessel 2 and baffles 4. In this manner, the hotter cooling medium can be caused to contact indirectly the upper portions of pipe 5 in which reaction has not yet evolved a sufficient amount of heat reaction. The reacting mass which will have substantially reacted by the time it reaches the bottom 9 of pipe 5 is expanded into the bottom end of pipe 6, the diameter of which, at least at 10, is such that a pressure drop occurs so that the cooling effect due to the expansion which there occurs will internally cool the mass of reactants flowing downwardly through pipe 5. Trialkyl aluminum and unreacted ethylene and some olefins are recovered at 8 at a pressure in the range of about atmospheric to about 100 pounds per square inch and at a temperature of about 100 to 250° F.

Referring now to FIGURE 2, triethyl aluminum and ethylene are passed through pipe 20 which for an initial portion of its length 21 is disposed in cooling medium-containing vessel 22 in which a cooling medium can actually serve to heat the portion 21 since the reactants are introduced at a temperature below that of a cooling medium. The reactants pass successively through portion 23 and portion 24 of pipe 20. Portion 23 is cooled by expanding reactants, the expansion of which is brought about in conduit 25 by orifices 26 through which reacting mass passes after discharge from portion 24 of pipe 20, portion 24 serving to further cool the reacting mass at or near the completion of the reaction therein.

The heat-exchange medium which can be oil and which can be at a temperature above that of the entering reactants, but which in some cases can be below the temperature of said reactants, is so adjusted as to control the temperature of the reacting mass for reasons explained in this disclosure. The temperatures in this embodiment of the invention will be substantially in the same ranges as herein given. One skilled in the art can select the particular temperature and pressure as well as residence time best suited to his needs.

Upon study of FIGURE 1 and FIGURE 2, it will be evident that the flow of reactants into and from the reaction zone can be reversed. That is, it is possible in FIGURE 1 to pass the reacting mass through inner pipe 6 and to have the cooling of the expanding mass take place surrounding pipe 6 by passing the expanding mass through pipe 5 in the annulus between pipes 5 and 6. In this manner, there is but a species of one-sided cooling of pipe 6 since both expanding reactants and coolants will be to the same side, as it were, of pipe 6. This operation is not now preferred. Similarly, viewing FIGURE 2, it is possible to expand portion 23 of pipe 20 to encompass the expanding reactants in pipe 25, thus, cooling the reactants in pipe 25 internally of pipe portion 23. This operation is not now preferred.

Referring now to FIGURE 3, pipes 30 and 31 form annulus 32. Reactants enter into and pass through and, while passing through, are reacted in annulus 32. The reacted reactants are passed into pipe 31 by being turned to 180° at end 33 of the apparatus. Passing through pipe 31, the reacted mass is expanded at intervals by passing through expansion orifices 36 which, in this embodiment, are spaced so as to provide the maximum cooling at the portion of tube 31 at which the reaction in annulus 32 is greatest, thus, according to the invention, yielding good control of the reacting mass for reasons set out in this disclosure. In FIGURE 3, at "B," the reaction takes place within tube 40 disposed in outer tube 41 and the reacted reactants are expanded in annulus 42.

It will be evident to one skilled in the art having studied this disclosure that the concentric tubes or zones can be so mounted that the inner tube, as well as the annulus, contains supporting elements which can be perforated rings and discs, respectively, in the annulus and inner tube so that very thin-walled construction can be accomplished, yet the structure be rugged and be able to withstand considerable pressures.

The sizes and measurements, as well as relative sizes and measurements of the respective portions of the apparatus, are within the skill of the art to provide in the light of this disclosure.

The positioning of elements 26 and 36 in FIGURES 2 and 3, respectively, can be variously accomplished. The distance between successive expansion orifices can be gradually reduced and the sizes of the orifices so correlated as to obtain quite uniform temperature within the reacting mass, as a feature of this invention.

*Example*

In an operation according to the invention, a 40-foot reaction tube having an internal diameter of one inch is jacketed with a 40-foot long tube having an internal diameter of three inches. There is fed a 25 percent triethyl aluminum in cyclohexane solution together with 22 mols of ethylene per mol of triethyl aluminum at a flow rate of 0.01 ft./sec. through the tubes. A pressure of 2000 pounds per square inch absolute and a temperature of 240° F. is maintained substantially throughout the length of the reaction tube by expanding the reacted mass in the jacket tube to a pressure of about 50 mm., the below atmospheric pressure being provided by means not shown for sake of simplicity. The outlet product contains 7 mols of ethylene per mol of aluminum alkyl. The reaction product contains a wide distribution of chain lengths, the average of which is 12 carbon atoms. The temperature of the cooling medium in the surrounding vessel in which the concentric tubes are contained is 100° F. The cooling medium in the example is cyclohexane but can be pentane, isopentane or other material boiling in the boiling range of these hydrocarbons. The reactor tube can be made of any suitable metal or alloy but should not contain nickel in view of an adverse effect of this metal. It can be made of copper, bronze, or aluminum.

Reasonable variation and modification are possible within the scope of the foregoing disclosure, the drawings and the appended claims to the invention, the essence of which is that a method and apparatus have been provided for conducting chemical reactions in which exothermic heat of reaction and cooling obtained by expansion of a reacted mass are utilized under conditions which can be adiabatic to control the temperature of such a reacting mass.

We claim:

1. A method of conducting a reaction which yields exothermic heat and the temperature of which is desirably controlled which comprises passing reactants of sufficient volatility to allow vaporization of at least a portion thereof at reduced pressure through a first elongated zone or passageway maintained under an elevated pressure at an elevated temperature, allowing reaction to take place in said zone while the reactants are flowing therethrough, then passing the thus-reacted reactants through a second elongated zone or passageway, one of said first and second zones contiguously surrounding and enclosing at least a portion of the other of said zones, the pressure on the reacted reactants in said second zone being sufficiently reduced to provide for vaporization and expansion of at least a part of the volatile constituents in the reaction phase to provide a reduction in the temperature thereof and a consequent heat transfer from said first to said second zone.

2. A method of producing a growth reaction involving an aluminum trialkyl and a 1-alkene which comprises passing these reactants which are of sufficient volatility to allow vaporization of at least a part thereof at reduced pressure through a first elongated zone or passageway maintained under an elevated pressure and an elevated temperature, allowing reaction to take place in said zone while the reactants are flowing therethrough, then passing the thus-reacted reactants through a second elongated zone or passageway, one of said first and said second zones contiguously surrounding and enclosing at least a portion of the other of said zones, the pressure on the reacted reactants in said second zone being sufficiently reduced to provide for vaporization and expansion of at least a part of the volatile constituents in the reaction phase to provide a reduction in the temperature thereof and a consequent heat transfer from said first to said second zone.

3. A method of producing a growth reaction with triethyl aluminum and ethylene which comprises passing these reactants through a first elongated zone or passageway maintained under an elevated pressure and an elevated temperature, allowing reaction to take place in said zone while the reactants are flowing therethrough, then passing the thus-reacted reactants through a second elongated zone or passageway, one of said first and said second zones contiguously surrounding and enclosing at least a portion of the other of said zones, the pressure on the reacted reactants in said second zone being sufficiently reduced to provide for vaporization and expansion of at least a part of the volatile constituents in the reaction phase to provide a reduction in the temperature thereof and a consequent heat transfer from said first to said second zone.

4. A method according to claim 3 wherein the first and second zones are encompassed within a third zone through which a heat-exchange medium is circulated.

5. The method of claim 4 wherein at least one section of said first zone is directly contacted in heat exchange relationship by said heat exchange medium and at least one other section of said first zone is directly contacted in heat exchange relationship by the reaction phase in said second zone.

6. A method according to claim 3 wherein said second zone concentrically contains said first zone.

7. A method according to claim 3 wherein the reacted mass in said second zone is passed through a series of pressure-reducing zones.

8. Heat exchange apparatus comprising an elongated tube having a closed end, a second tube disposed within said elongated tube and forming an annulus therewith extending substantially the entire length of said elongated tube and almost to said closed end of said elongated tube, said second tube being open at its extremity located near said closed end of said elongated tube thereby forming a continuous passageway with said annulus, said annulus or said second tube having therein at least one pressure drop producing orifice, comprising a flow restriction intermediate the ends of said second tube having a cross sectional area substantially less than the cross sectional area of said annulus or said second tube, the tubes at their upper ends arranged to be separately in open communication with any desired place.

References Cited by the Examiner

UNITED STATES PATENTS

| 2,763,532 | 9/1956 | McKinnis | 260—683.15 |
| 3,081,289 | 3/1963 | Cheney et al. | 23—284 |
| 3,149,176 | 9/1964 | Glazier et al. | 23—284 |
| 3,153,578 | 10/1964 | Taylor | 259—4 |

FOREIGN PATENTS

| 1,270,827 | 7/1961 | France. |
| 1,273,795 | 9/1961 | France. |

DELBERT E. GANTZ, Primary Examiner.

R. H. SHUBERT, Assistant Examiner.